G. A. ANDERSON.
CAR TRUCK.
APPLICATION FILED JAN. 19, 1921.
1,414,918.
Patented May 2, 1922.
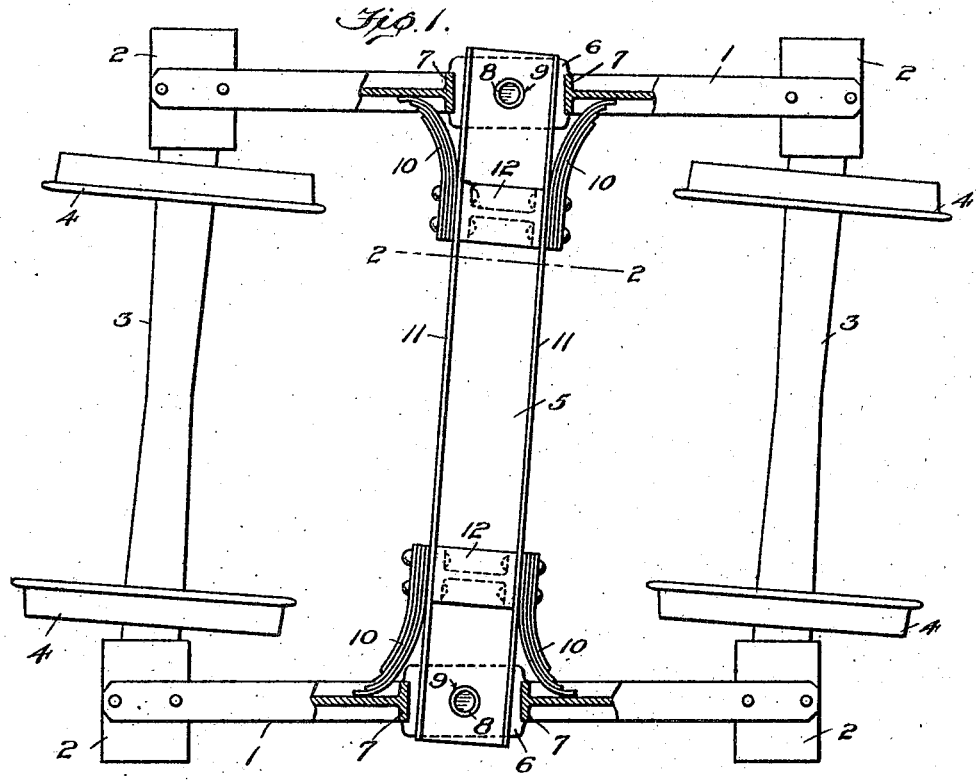
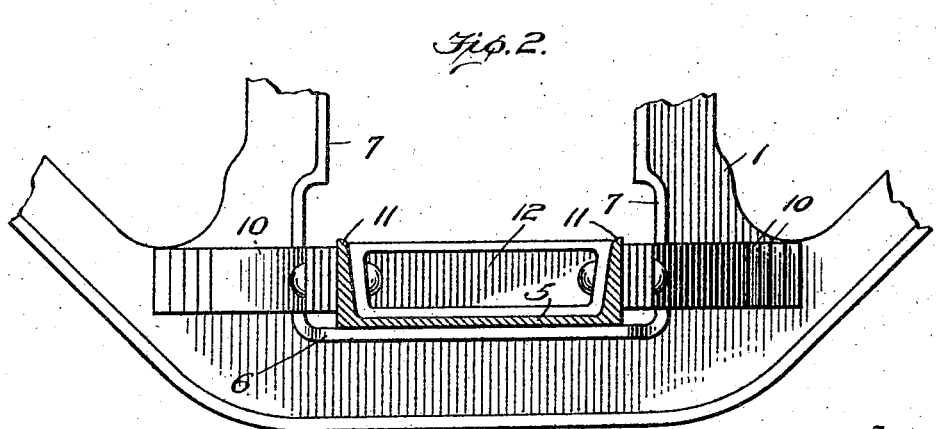
Witness
Edwin L. Bradford
Inventor
Gustaf Arvid Anderson
By
his Attorney

UNITED STATES PATENT OFFICE.

GUSTAF ARVID ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,918.  Specification of Letters Patent.  Patented May 2, 1922.

Application filed January 19, 1921. Serial No. 438,477.

*To all whom it may concern:*

Be it known that I, GUSTAF ARVID ANDERSON, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to flexible car trucks whose side frames are connected in a manner permitting them to be capable of sufficient relative movement longitudinally of the truck to relieve the truck parts from the distorting and destructive effects of extraneous forces applied to the truck as a result of its passage around curves or over bad rail joints or by coming in contact with projecting switch points or because of inequalities in the truck wheels.

Generally stated, the principal object of my invention is to provide a flexible car truck in which the side frames, while connected transversely of the truck by means permitting them to have the desired range of longitudinal displacement, are opposed and cushioned in such displacement by a yielding resistance which normally maintains or tends to maintain them in square relation, said mechanism operating to restore the side frame members to square relation when the extraneous force causing their longitudinal displacement ceases to act. More specifically, the yielding means for controlling the relative longitudinal movements of the side frames is preferably designed to be of a nature affording a comparatively low initial resistance to the displacement of the side frames but to have a changing rate of resistance so that the cushioning force toward the end of an extreme displacement of the side frames is relatively high. By thus opposing the displacement of the side frames with yielding means whose resistance is not directly proportional to the extent of their relative displacement, the side frame members are permitted readily to yield longitudinally of the truck when the latter is passing around a curve, while a high cushioning resistance is afforded for the purpose of relieving the truck parts from abnormally severe strains to which they are at times subjected because of the imperfect condition of the track.

In the embodiment of my invention illustrated in the drawings, the yielding means for controlling the longitudinal displacement of the side frame members are in the form of leaf springs, but it is to be understood that this construction is but a preferred application of the principle of my invention.

In the drawings which have been chosen for the purposes of illustration,—

Figure 1 is a view, partly in plan and partly in horizontal section, showing a car truck embodying the invention, the bolster, which may be of a form commonly employed in flexible trucks, being omitted, and the truck parts being illustrated in a position which they would assume in passing around a curve.

Figure 2 is a detail section on the line 2—2, Fig. 1, the parts being in their normal relation.

In the drawings, 1 indicates transversely spaced side frame members each of which is provided at its opposite ends with journal boxes 2 receiving the journal ends of the axles 3 by which the truck wheels 4 are carried.

The side frame members 1 are movably connected by a cross connecting means 5 which is preferably in the form of a channeled spring plank having its flanges extending upwardly. The opposite ends of the cross connecting member 5 preferably extend into the corresponding bolster openings 6 of the respective side frame members, sufficient clearance being allowed between the member 5 and the neighboring faces of the truck column 7 to allow the cross connecting means to turn through a comparatively large angle with respect to the side frames 1 so as to permit the latter to shift longitudinally of the truck in either direction from their normal or square position. The bolster (not shown) also extends into the bolster openings 6 between the columns 7 of the side frames and, as is usual, is designed to be capable of shifting its angular relation with respect to the side frames 1 when the latter are displaced longitudinally of the truck. The cross connecting means or spring plank 5 is movably connected to the side frames, such connection preferably being effected by providing each side frame centrally of its bolster opening with an upwardly projecting pivot boss 8 which enters a correspondingly formed pivot aperture 9 in the spring plank.

The spring means employed for resisting relative longitudinal displacement of the side frames 1 from normal position is designed to oppose such displacement at an increasing rate of resistance, the initial resistance being preferably low and progressively increasing until at the end of the extreme displacement of the side frames it is comparatively high. A plurality of leaf spring means 10 may be and preferably are employed to effect such a yielding resistance. Each spring means 10 preferably comprises a series of leaves which are riveted or otherwise rigidly secured at their inner ends to the cross connecting means 5. In case a spring plank, such as 5, is employed the spring means 10 are preferably secured to the opposite sides thereof by attaching them to the flanges 11. Fillers or thrust blocks 12 may be interposed between the inner ends of adjacent spring means 10 to support the flanges 11 of the spring plank against bending strains. The outer ends of the spring means 10 normally engage the respective frame members 1 so as to exert pressure upon the inner side of each frame on opposite sides of its pivotal connection with the spring plank. By this means the side frame members 1 are yieldingly maintained in normal or square relation perpendicular to the spring plank 5. A departure longitudinally of the truck of either side frame member 1 from its normal position causes a change in the angular relation of the side frame to the spring plank 5 and therefore effects an energizing deflection of one or the other of the spring means 10 adjacent the side frame dependent upon the direction of movement of the latter.

The resistance afforded by the leaf spring means 10 to relative longitudinal displacement of the side frames from normal position does not uniformly increase as the displacement of the side frames proceeds, but increases at a progressively changing rate, which rate of change may advantageously be uniform or substantially so. The resistance offered by the spring means to the initial displacement of either of the side frames from normal position preferably is comparatively low, while the resistance at the end of the displacement is preferably relatively high, the diagram of spring resistance being in the form of a curve instead of a straight line.

It is obvious that many changes may be made in the described embodiment of my improved truck without departing from the spirit of my invention.

I claim:—

1. In a car truck, the combination with side frame members which are relatively movable longitudinally of the truck, of means for movably connecting said side frame members, and means located intermediate the ends of said side frame members and having a changing rate of resistance for yieldingly opposing relative longitudinal displacement of said side frame members from normal position.

2. In a car truck, the combination with side frame members which are relatively movable longitudinally of the truck, of means extending transversely of said truck and adapted to connect the said side frame members, and spring means carried by said connecting means and adapted to be deflected by a longitudinal movement of either side frame member from normal position, said spring means also being adapted to offer resistance at an increasing rate to such longitudinal displacement of said side frame members.

3. In a car truck, the combination with side frame members which are relatively movable longitudinally of the truck, of means for movably connecting said side frame members, and means having an increasing rate of resistance for yieldingly opposing relative longitudinal displacement of said side frame members from normal position.

4. In a car truck, the combination with side frame members which are relatively movable longitudinally of the truck, of means for movably connecting said side frame members, and means having a uniformly increasing rate of resistance for yieldingly opposing relative longitudinal displacement of said side frame members from normal position.

5. In a car truck, the combination with side frame members which are relatively movable longitudinally of the truck, of means for movably connecting said side frame members, and means having an increasing rate of resistance for yieldingly opposing relative longitudinal displacement of said side frame members, the resistance afforded by said last named means being active to oppose relative longitudinal displacement of said side frame members from normal position at all stages of such displacement.

6. In a car truck, the combination with side frame members which are relatively movable longitudinally of the truck, of a spring plank for connecting said side frame members, and yielding means mounted upon said spring plank and bearing against one of said side frame members for resisting a displacement of either of said side frame members from normal, said means being adapted to offer a low resistance to initial displacement of either of said frame members and to afford a resistance of progressively increasing rate opposing relative longitudinal displacement of said side frame members from normal position.

7. In a car truck, the combination with side frame members which are relatively movable longitudinally of the truck, of a transversely extending member adapted to connect the said side frame members, and leaf springs mounted on opposite sides of said transversely extending member and respectively operating upon an adjacent side frame member for yieldingly opposing a relative longitudinal displacement of said side frame members from normal position.

8. In a car truck, the combination with side frame members which are relatively movable longitudinally of the truck, of a spring plank pivotally connected to said side frame members, and leaf springs rigidly secured to the opposite sides of said spring plank and each adapted to engage the adjacent side frame member for yieldingly resisting a relative longitudinal displacement of said frame members from normal position.

9. In a car truck, the combination with a pair of spaced side frame members which are relatively movable longitudinally of the truck, of a flanged spring plank pivotally connected at its opposite ends to said side frame members, and springs each of which is secured at one end to one of the flanges of said spring plank and bears at its opposite end against the adjacent side frame member, said springs being adapted yieldingly to resist a relative displacement of said side frame members from normal position.

10. In a car truck, the combination with side frame members which are relatively movable longitudinally of the truck, of means for movably connecting said side frame members, and yielding means involving a plurality of springs adjacent to and cooperating with one of said side frame members and adapted to be dissimultaneously energized upon longitudinal movements of said side frame in opposite directions from its normal position.

In testimony whereof I affix my signature.

GUSTAF ARVID ANDERSON.